United States Patent [11] 3,610,314

| [72] | Inventor | Frederick G. Hochgraf |
|---|---|---|
| | | Durham, N.H. |
| [21] | Appl. No. | 10,263 |
| [22] | Filed | Feb. 10, 1970 |
| [45] | Patented | Oct. 5, 1971 |
| [73] | Assignee | Aaron J. Bronstein |
| | | Swampscott, Mass. |

[54] METHOD OF MAKING A SEGMENTAL METAL MOLD CAVITY
19 Claims, 14 Drawing Figs.

[52] U.S. Cl. .................................................. 164/27,
164/35
[51] Int. Cl. .............................................. B22c 9/04
[50] Field of Search............................. 164/34, 35,
36, 137, 23, 27

[56] References Cited
UNITED STATES PATENTS

| Re. 26,785 | 2/1970 | Kaplan | 164/35 X |
| 1,364,123 | 1/1921 | Lougheed | 164/35 |
| 2,890,506 | 6/1959 | St. Palley | 164/35 |
| 3,257,693 | 6/1966 | Chandley et al. | 164/36 X |

Primary Examiner—J. Spencer Overholser
Assistant Examiner—John E. Roethel
Attorney—Kenway, Jenney & Hildreth ABSTRACT: A method of making a segmented negative mold cavity having the segments in precise registration. The segments are formed from investments prepared from a number of fusible wax negative models, these models all deriving their shapes from the pattern with substantially equal cumulative errors. Equalization of errors in the models is achieved by the use of plural preliminary negative impressions formed in a flowable, hardenable material having minimal or negligible shrinkage upon hardening.

PATENTED OCT 5 1971    3,610,314

INVENTOR
FREDERICK G. HOCHGRAF
BY Kinway Jenney
D Hildreth

ATTORNEYS

INVENTOR
FREDERICK G. HOCHGRAF
BY Kenway Jenney & Hildreth
ATTORNEYS

METHOD OF MAKING A SEGMENTAL METAL MOLD CAVITY

BACKGROUND OF THE INVENTION

The field of this invention generally comprises the manufacture of mold cavities. Such cavities are employed in injection molding of plastics, closed die forging of metals, die casting of metals, and compacting of powders of ceramics, metals and plastics. More particularly, this invention relates to processes including the use of investments to form segmental mold cavities.

The U.S. Pat. to St. Palley No. 2,890,506, dated June 16, 1959 discloses a method for making cast inserts or cavities for dies. These inserts are intended to be placed in hollow die blocks, thereby forming mold cavities. The process consists in the steps of positioning a pattern partially within a die block, casting a hard setting fluid material into the die block around the pattern, casting a low melting point wax over the pattern with the die blocks closed to form a first insert model, transferring the pattern to the first insert model and casting therefrom a second low melting point wax insert model, using the two insert models to form investments of refractory cement, and casting the metal mold inserts in the two investments so formed.

The above method has certain disadvantages including the failure of the resulting metal mold inserts to register perfectly when assembled into the die blocks. As a result, the dies produce imperfect casts. St. Palley partially recognized this difficulty by noting the effects of thermal contraction on the die metal castings. The solution he proposed was to compensate for the metal shrinkage by the expansion of the refractory castings at a high baking temperature. This method of compensation, in practice, has either been incapable of substantial accomplishment, or it has not been demonstrated to be potentially effective in improving the registration of the die inserts.

As a result, the St. Palley method has not been employed in large portions of the plastics industry, nor has it displaced the earlier, more expensive and time consuming methods that require die sinking through removal of metal chips by hand and machine, as now widely practiced in the manufacture of accurate mold cavities.

It is a principal object of this invention to provide a new method for inexpensively making very accurate metal dies or mold cavities. The need for such a method is readily demonstrated by considering the high cost of such dies when manufactured by the commonly used methods. Such costs reflect a large element of skill on the part of die makers as well as the substantial time required for manual techniques to ensure proper accuracy and fit. Subsumed under the foregoing object, therefore, is the further object of devising a method that does not require time consuming manipulative or machining skills.

Also, uniformity and reliability of results are desirable, as for example in the manufacture of plastic shoe insoles. For any given shoe style, die sets are required for each size, which entails a very substantial inventory of dies for the shoe manufacturer, and increases his tooling costs to levels that preclude production runs of limited volume. If dies were not so costly and could be more rapidly produces, it appears that more styles could be offered and sold economically, thereby better serving the needs of the public and increasing demand.

Similar considerations also apply in other sectors of the plastics industry, including for example, molded plastic parts used on consumer articles of all kinds, and novelties.

SUMMARY OF THE INVENTION

This invention provides a method of making mold cavities that furnishes the desired economy and ease of manufacture while achieving a very high precision of die fit. This method includes novel steps and means effective to eliminate the difficulties of the St. Palley process. These steps include the making of preliminary negative impressions in a flowable, hardenable material having limited or negligible shrinkage characteristics upon hardening. By adding and adapting these steps and means to an investment technique as broadly proposed by St. Palley, a substantial improvement has been accomplished over this technique.

These results have been achieved, firstly, through an insight into the root causes of the difficulties with the St. Palley process, and secondly, through the provision of novel steps and means for dealing with these causes.

It has been recognized that the difficulties of die fit arise from errors or deviations of form in the investments from which the dies are cast, these errors being in turn derived from the earlier steps in which the pattern wax insert models are them selves formed. It has also been discovered that while the errors in the insert models are at least partly a result of inherent thermal expansion and contraction properties of the pattern waxes or their functional equivalents, which properties are to some extent unavoidable and irreducible, novel steps may be taken to control and equalize these errors.

These novel steps in turn arise from a further recognition of the cumulative nature of errors in the several steps of the manufacturing process. Thus an error in the first insert model of St. Palley results in the inability to fit the transferred pattern precisely thereto. The second insert model then not only contains errors equivalent to those produced in the first insert model, but also reproduces those same errors as well. As a result, the second insert model contains more cumulative errors than does the first, and it is this inequality in the cumulative errors present in the models, and in the investments made from the models, that results in the ultimate lack of precision and fit in the metal mold cavities or dies.

The present invention, based on the recognition of the detrimental role of the inequalities in cumulative errors, proposes a process designed primarily to equalize rather than to minimize these errors for each of the individual mold segments to be formed. This process, as hereinafter further described, accomplishes this result through the novel use of mold materials having selected properties to produce preliminary impressions. These latter are made directly from the pattern but are not employed directly in the formation of the investments as are the inset models of St. Palley.

DESCRIPTION OF THE PREFERRED EMBODIMENT

Figure 1:
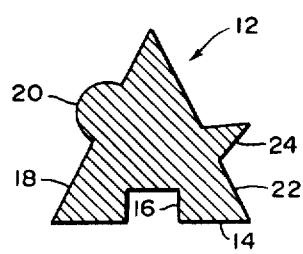
FIG. 1 is an elevation in section of a representative pattern of the product to be formed in the mold cavities produced by this invention.

FIG. 1 is an elevation is section of a pattern 12 which is in the exact form of a product to be produced by a set of mating die segments in an injection mold. The particular shape illustrated is selected for its generality, and it will be understood that an indefinitely large number of other shapes may be produced by the method herein described. The particular shape determines the number of die segments to be used, since these segments must be withdrawn from the hardened cast product without injury to it. The illustrated pattern is a triangular block with the identical cross section in all planes parallel to the sheet between parallel end faces, although in practice the end faces need not be parallel and only need to meet the requirements of parting. One surface 14 has a rectangular slot 16, a second surface 18 has a semicylindrical protrusion 20 and a third surface 22 has a triangular protrusion 24. It will be evident that this shape requires the use of three die segments to form these surfaces with the plane end faces being formed either by extensions of the three segments shown or by additional segments.

Various materials may be used to form the pattern 12. The material selected must have sufficient hardness, strength and thermal stability to withstand the process steps hereinafter described Typical materials include but are not limited to wood, plaster of Paris, plastic, metal and some waxes. The surfaces of the pattern must be finished as precisely as the desired product, as they are reproduced in minute detail in the finished mold cavities.

In the process of FIGS. 2 to 10, the pattern 12 is first supported on a rod 26 in spaced relation to the inner walls of a mold 28. The mold is illustrated schematically and is preferably built up of separable parts in a conventional manner, as shown in the above-mentioned patent or as described elsewhere in the literature of the art.

The space within the mold is then filled with a material 30 which forms the preliminary impressions that characterize this invention. This material is initially flowable and may have a liquid, viscous or pastelike consistency. It must be adaptable to conform closely to the surfaces of tee pattern when the mold is filled by the action of gravity, troweling, hydraulic or pneumatic pressure, or some combination of these or other suitable mold filling methods. After the mold is filled the material 30 must harden or set without shrinkage from the contiguous surfaces of the pattern, with or without voids occurring internally, that is, noncontiguously to the pattern. Suitable materials include resins and other polymers that become heavily cross-linked during polymerization, for example polyester, polyurethanes and epoxies. In addition, materials that set by cooling may be used, such as organics including filled polyvinyl alcohols, and metals of low melting point that have very small or negligible net volume change during solidification and cooling, such as alloys containing antimony, bismuth, lead, tin or zinc. Other suitable materials are those that set by hydrolysis such as gypsum and lime based cements.

The set body 30 is then removed from the mold 28 and parted along a selected line chosen to be one of the parting lines to the final segmental mold set. This is preferably accomplished by cutting away a portion of the body along flat surfaces such as 32 or curved surfaces such as 34, permitting removal of a preliminary impression segment 30a from the pattern. The pattern is then removed from the remainder of the body 30, this remainder usually being discarded.

Figure 4:
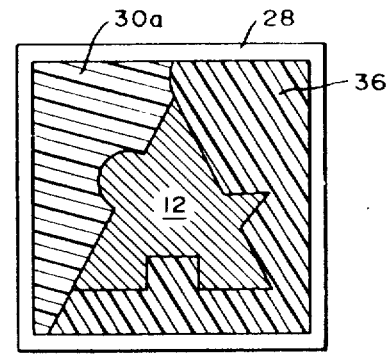
Figure 5:
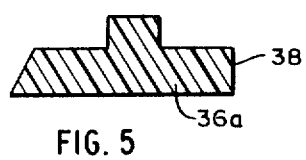

In the next step the segment 30a is returned to the mold 28 with the pattern fitted to its mating surface. The nonshrinking characteristics of the segment 30a ensure that the pattern will fit it with a very high degree of precision. In addition, the shape of the segment is such that it ordinarily provides sufficient support for the pattern to permit removal of the rod 26 at this stage. The mold 28 is then refilled with a body 36 as shown in FIG. 4, the latter body preferably comprising the same kind of material as the body 30. To prevent the body 36 from sticking to the other parts, the latter are first coated with a suitable mold release agent or parting compound such as liquid silicones and oils, or dry lubricants such as talc or graphite. After filling, the body 36 is allowed to set. After setting, the body 36 is removed from the mold 28 and parted along another selected line, in this case by cutting along a flat surface 38, permitting removal of a second preliminary impression segment 36a from the pattern. The pattern is then removed from the remainder of the body 36, this remainder being discarded.

Figure 6:
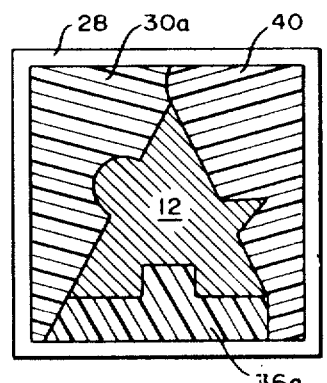

In the next step the preliminary segments 3a and 36a are both returned to the mold 28 with the pattern 12 fitted to their mating surfaces, and the mold is filled with a body 40 as described above, which is allowed to set, thereby forming a third preliminary impression segment as shown in FIG. 6.

Figure 7:
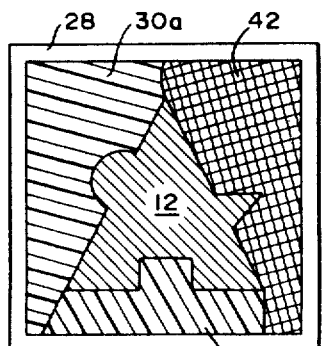
FIGS. 7 to 10 illustrate further steps in the formation of plural mating pattern wax models used in subsequent conventional steps involving the formation of refractory investments and casting the mold cavities therefrom.
Figure 9:
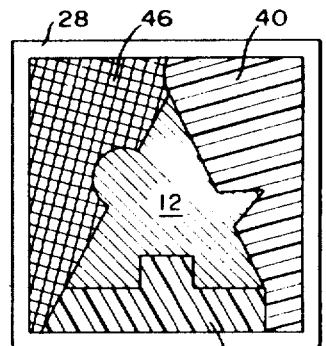

After the formation of all of the preliminary impression segments as described above, the negative wax models or pattern segments are formed as follows. The pattern 12 and all except one of the segments 30a, 36a and 40 are assembled and placed in the mold 28. As shown in FIG. 7, for example, the segment 40 has been removed. A body 42 of fusible wax, also referred to as "pattern wax" of the type commonly used in the "lost wax" process of investment casting, is flowed into the mold and allowed to harden. It will be apparent, therefore, that it is necessary for the preliminary segments to be made of a material that maintains its structural integrity at the casting temperature of the pattern wax, which is typically in the vicinity of 140° F. Suitable pattern wax materials include blends of natural waxes such as bay, spermaceti and petroleum waxes, and derived waxes such as silicones, including fillers such as cellulose or other organic polymers, for example. Other equivalent materials described in the literature of the art may also be employed in this step. Once cooled, the pattern segment 42 is removed from the mold, replaced by its corresponding preliminary impression segment 40, and a second segment such as 36a is removed. If desired, a mold release agent may be applied to the parts as described above. A body 44 of pattern wax is then flowed into the mold and allowed to harden. After this body is removed from the mold and its corresponding segment 36a returned thereto, a final segment 46 of pattern wax is cast as shown in FIG. 9.

Figure 10:
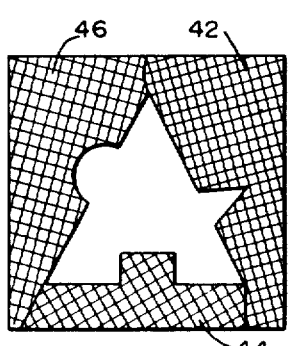

As shown in FIG. 10, the completed pattern segments 42, 44 and 46 may be fitted or registered very precisely together. This is so whether or not the materials of which they are formed undergo significant shrinkage as they solidify. For example, they may be made of waxes that decrease in volume upon cooling as a result of reduced molecular thermal agitation, or they may be made of other materials that undergo a phase change upon setting and thereby shrink in volume. In any case, it is noted that the extent of shrinkage is the same for each of the segments since each is formed by the pattern and adjacent preliminary impression segments that do not shrink; hence, none of the pattern segments contains shrinkage errors accumulated in the prior formation or casting of other pattern segments.

While the method of FIGS. 2 to 10 contemplates three mold segments, it may be employed to produce either a greater or fewer number of segments. For example, many products require only to two segments as in the case of molds for shoe insoles, previously mentioned. The manufacture of the required number of segments proceeds as described above, except for the necessary increase or reduction in the total number of process steps employed.

Figure 2:
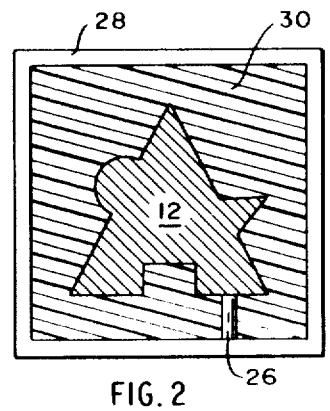
FIGS. 2 to 6 illustrate steps in the formation of plural mating preliminary impressions from the pattern.
Figure 3:
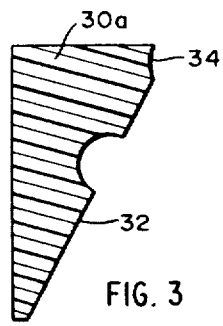
Figure 11:
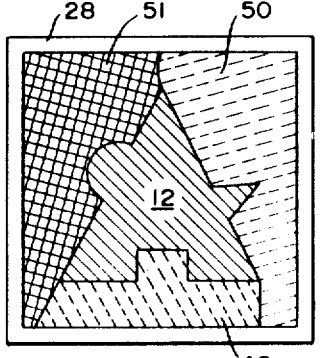
FIG. 11 illustrates a variation of the process in which the preliminary impressions are formed by using a built-up support for the pattern.

FIG. 11 illustrates a variation of the process by which alternate means may be employed in place of the support rod 26 of FIG. 2. In this case, one or more bodies 48 and 50 are formed of a shapeable, nonshrinking material to fit precisely to the pattern 12. These bodies may be substituted for the corresponding preliminary impression segments 36a and 40, thereby eliminating the need to form these segments. Preferably, these bodies are capable of being built the shaped to permit the definition of any desired flat or curvilinear parting surface between the segments. The material may be a hard-setting paste, a wax, a hard-setting cement of troweling consistency while soft, or a thermoplastic material that is shapeable while a warm and sets upon cooling. In the case illustrated in FIG. 11, the built-up bodies 48 and 50 comprise all but one of the necessary segments, and therefore a pattern segment 51 of pattern wax identical to the segment 46 may be cast without first casting a preliminary impression segment corresponding to the segment 30a. However, such a preliminary segment is preferably cast either before or after the segment 51 for use during the casting of each of the other pattern segments.

Once the pattern segments have been formed as described above, they may be used to form refractory investments by a conventional lost wax process, and the mold segments of the alloy Kirksite or other suitable die metal are cast in such investments. The usual method is to mount one or more of the pattern segments on a wax bar including a sprue, thereby forming a tree. The tree is placed in a flask and a gypsum based refractory material may be poured around the tree under vacuum; or if desired, a shell casting technique may be used in which a relatively thin shell of colloidal silica and refractory grain is cast around the tree. The wax is then melted out, the refractory is cured at an elevated temperature, typically between 1,000° and 1,800° F., and the die metal is cast into the cavity.

Figure 12:
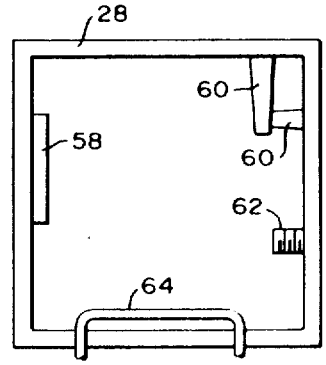
FIGS. 12 and 13 illustrate a variation in which the mold cavities may be provided with threaded holes, channels and other voids, if desired.
Figure 13:
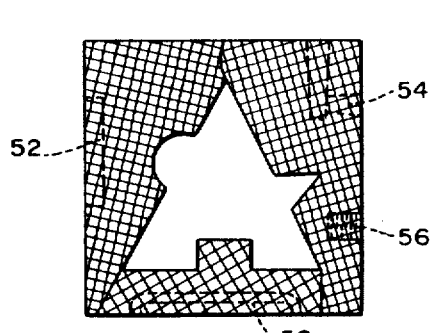

FIGS. 12 and 13 illustrate the adaptation of the novel process to the production of mold pattern segments having internal and external channels 52 and 54 and other voids such as a threaded hole 56 and a channel 58. To provide these features, cores are installed in the mold 28 during the casting of the mold pattern segments. These cores may include a groove-forming core 58, a pair of tapered cores 60, a threaded plug 62, a channel-forming core 64, and cores of other desired shapes. These cores are either withdrawn after the mold pattern segments are cast, as in the case of the cores 58 and 60, or they are formed of a material that can be destructively removed form the mold pattern segments after hardening, as in the case of the cores 62 and 64. Exemplary materials for the latter purpose include filled polyvinyl alcohol cores that may be removed by dissolving in water prior to the casting of the investments.

In the embodiment of FIGS. 12 and 13 and the voids produced result in similar voids being formed in the final die segments. Another method of producing such a void is as follows. A metal or ceramic object having the shape and size of the desired void is secured by means of a lug to the mold frame 28 before formation of the mold pattern segments as described above. This object is trapped, except for the protruding lug, in a mold pattern segment, When the ceramic investment is thereafter poured, it surrounds and holds the lug fast, so that when the pattern wax is melted out, the object remains in place and later becomes encased within the die metal when the latter is cast in the investment. The object is finally removed from the die metal when it has cooled.

A still further variation is to leave in place the object thus encased in the die metal for subsequent use as a reinforcement, heat sink, holddown device or the like.

Figure 8:
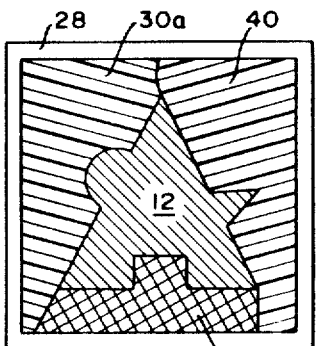
Figure 14:
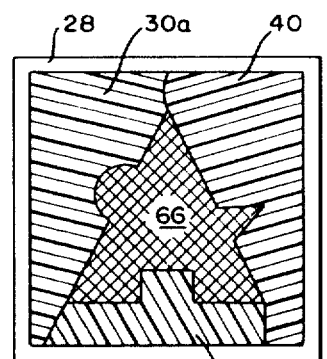
FIG. 14 illustrates replication in pattern wax of the original pattern.

In the various procedures described above, the preliminary impression segments such as 30a 36a and 42 are used to form mold pattern segments such as 42, 44 and 46 as shown in FIGS. 7 to 9 There are also other industrial processes in which the impression segments have utility. In these processes, the segments 30a, 36a and 40 are assembled as shown in FIG. 14 and a pattern wax replica 66 is formed in the cavity, preferably by injection through suitable holes drilled in the segments. This replica is then invested according to the conventional lost wax process in the same manner as the mold pattern segments described above, and metal or other materials are cast into the refractory cavity.

The material chosen for the last-mentioned casting step depends on the particular end use. One example is the choice of a highly machinable material such as brass or aluminum. In this case a duplicate pattern is formed which is a precise duplicate of the pattern 12 and which may be economically modified in shape or size. A second example is the choice of a refractory, erosion-resistant material such as a tool steel or Hastelloy. In this case the duplicate pattern may be used as an electrode in various known electrodischarge or spark erosion machining operations. In this same example, as an alternative to using a solid piece of erosion-resistant material, the duplicate may be formed of a less durable material that is afterwards coated with an erosion-resistant layer of a material such as a boride or a tungsten carbide. A third example is the choice of a chemically resistant material such as stainless steel or monel metal. In this case the duplicate pattern may be used as an electrode for electrochemical milling or electrochemical polishing. An electrode prepared in this way may be used for polishing mold cavities made by the process previously described herein, and such use further reduces the time and expense of die preparation.

I claim:

1. The method of making a segmental metal mold cavity, including the steps
   conforming a first flowable, hardenable and dimensionally stable body to a pattern and defining a first preliminary impression segment,
   molding a second flowable, hardenable and dimensionally stable body to said pattern and segment and defining a second preliminary impression segment, said molding step being repeated with the pattern fitted to the segments previously produced until the segments so produced define the entire pattern,
   forming a pattern wax model corresponding to each said segment by placing the pattern and all other of said segments in a mold and injecting a molten wax therein,
   forming a refractory investment using each pattern wax model,
   and casting a die metal in each said investment.

2. The method according to claim 1, in which the flowable, hardenable and dimensionally stable bodies are characterized by negligible shrinkage in volume upon changing from the flowable to the hardened state.

3. The method according to claim 1, in which the flowable, hardenable and dimensionally stable bodies are selected from the group comprising polyester, vinyl and epoxy resins, gypsum and lime-based cements, and filled compositions of one or more of said materials wherein the filling materials are characterized by low coefficients of thermal expansion.

4. The method according to claim 1, in which mold release agents are applied to the pattern and any segments filled thereto during a molding step.

5. The method according to claim 1, in which at least one of the preliminary impression segments is defined by parting it from the pattern along a selected line thereon.

6. The method according to claim 5, in which the parting of the segment consists in cutting it from the remainder of the body from which it is formed along a selected parting surface.

7. The method according to claim 1, in which the number of preliminary impression segments is related to the shape of the pattern.

8. The method according to claim 1, in which the conforming of the first body to the pattern consists in building it up around the pattern and manually forming a parting surface along a selected line thereon.

9. The method according to claim 1, in which the first body is cast around the pattern in a mold.

10. The method according to claim 1, in which a void defining core is mounted in the space occupied by one of the preliminary impression segments prior to the formation of the corresponding pattern wax model.

11. The method according to claim 10, in which the core is adapted for removal without destruction of the solidified pattern wax model.

12. The method according to claim 11, in which the core is water soluble.

13. The method according to claim 10, in which an object is mounted partially within and partially outside of the space occupied by one of the preliminary impression segments prior to the formation of the corresponding pattern wax model, said object becoming partially imbedded in said pattern wax model, said object thereafter becoming partially imbedded in the corresponding refractory investment and die metal.

14. The method according to claim 13, in which said object is subsequently removed from the die metal.

15. The method according to claim 13, in which said object is substantially permanently partially encased within the die metal.

16. The method of making a segmental metal mold cavity, including the steps of
   molding a flowable, hardenable and dimensionably stable body to a pattern,
   parting said body to release the pattern therefrom and to define a preliminary impression segment thereof, fitting the pattern to said segment and repeating for foregoing steps until the segments so produced define the entire pattern, forming a pattern wax model corresponding to each said segment by placing the pattern and all other of said segments in a mold and injecting a molten wax therein, forming a refractory investment using each pattern wax model, and casting a die metal in each said investment.

17. The method of making a duplicate of a pattern, including the steps of conforming a first flowable, hardenable and dimensionally stable body to the pattern and defining a first preliminary impression segment, molding a second flowable, hardenable and dimensionally stable body to said pattern and segment and defining a second preliminary impression segment, said molding step being repeated with the pattern fitted to the segments previously produced until the segments so produced define the entire pattern, fitting together said segments, forming a pattern wax model corresponding to said pattern by injecting a molten wax in the cavity defined by said segments, forming a refractory investment using said pattern wax model, and casting a flowable, hardenable material in said investment.

18. The method according to claim 17, in which the hardenable material used in the final step is of a type suitable for use as an electrode.

19. The method according to claim 17, in which the hardenable material used in the final step is deformable after hardening to modify the shape of the duplicate.